(12) United States Patent
Mello

(10) Patent No.: US 8,783,746 B1
(45) Date of Patent: Jul. 22, 2014

(54) RECOVERY STABILIZING POLE

(71) Applicant: Craig S Mello, Tiverton, RI (US)

(72) Inventor: Craig S Mello, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 28 days.

(21) Appl. No.: 13/630,284

(22) Filed: Sep. 28, 2012

(51) Int. Cl.
*B66C 1/00* (2006.01)
*B25J 1/04* (2006.01)

(52) U.S. Cl.
CPC .......................................... *B25J 1/04* (2013.01)
USPC ............................ 294/104; 294/209; 294/66.1

(58) Field of Classification Search
USPC ................ 294/209, 210, 211, 111, 104, 66.1, 294/19.3, 902
See application file for complete search history.

(56) References Cited

U.S. PATENT DOCUMENTS

| | | | |
|---|---|---|---|
| 688,425 A * | 12/1901 | Loewenstein | 294/104 |
| 2,522,692 A * | 9/1950 | Speer | 294/66.1 |
| 4,374,600 A * | 2/1983 | van Zelm | 294/111 |
| 5,192,104 A * | 3/1993 | Lin | 294/104 |
| 5,392,800 A * | 2/1995 | Sergi | 135/65 |
| 5,823,590 A * | 10/1998 | Forrest et al. | 294/104 |
| 5,941,587 A * | 8/1999 | Wolff et al. | 294/103.1 |
| 6,139,077 A * | 10/2000 | Molzan, II | 294/111 |
| 6,543,824 B2 * | 4/2003 | Beaudrie | 294/24 |
| 7,677,619 B2 * | 3/2010 | Hutchings et al. | 294/105 |
| 8,381,748 B2 * | 2/2013 | Martin | 135/66 |

* cited by examiner

*Primary Examiner* — Saul Rodriguez
*Assistant Examiner* — Gabriela Puig
(74) *Attorney, Agent, or Firm* — James M. Kasischke; Michael P. Stanley

(57) ABSTRACT

A recovery stabilizing pole includes a tube having a passageway formed therethrough, and a handle pivotally joined to the tube. A fixed claw member and a hinged claw member are joined to a distal end of the tube, the hinged claw member being capable of pivoting with respect to the fixed claw member. One end of a cable is joined to the handle and the other is joined to the hinged jaw member. Increased tension in the cable causes pivoting of the hinged jaw member with respect to the fixed jaw member. Embodiments include an adjustment means at the distal end of the tube for angling the claw members with respect to the tube and different tensioning means for the cable.

10 Claims, 10 Drawing Sheets

RECOVERY STABILIZING POLE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates to a device that assists in the removal of an object from the water. More particularly, the present invention relates to a recovery stabilizing pole that assists in stabilizing an underwater vehicle such as a torpedo, so as to attach a snap-ring to the nose of the vehicle, allowing the vehicle to be placed on a recovery vessel.

(2) Description of the Prior Art

During the testing and evaluation phases related to the underwater vehicles, such as vehicles operating in the water, there remains a need to facilitate the retrieval of the vehicle onto a recovery vessel. Currently when the vehicle comes to the surface after its mission, the vehicle floats to the surface and bobs in the water until it can be retrieved. The recovery vessel comes alongside the vehicle, and a person tries to attach a snap-ring with a rope to the nose ring of the vehicle. This attachment effort is time consuming as well as being costly because the recovery vessel can be damaged by the vehicle hitting against it, especially during high sea states. Typically, this problem occurs most often with 21 inch vehicles used typically by the United States Navy; however, it may also occur when utilizing smaller or larger diameter vehicles. There remains a need to provide a device that assists in reducing the time, effort, and damage involved in retrieving a vehicle in the water into a recovery vessel.

SUMMARY OF THE INVENTION

Accordingly, it is an object of the present invention to provide a device that would assist in stabilizing a vehicle, so as to attach a snap-ring to the nose of the vehicle and thereby allow the vehicle to be more quickly and more safely placed into the recovery vessel.

It is another object of the present invention to provide a device that can be used in an exigent situation when the vehicle is too close to the recovery vessel, allowing the vehicle to be pushed away from the vessel.

In accordance with one embodiment of the present invention, a device is provided which allows the retrieval team onboard the recovery vessel to hold onto the nose ring of the vehicle, facilitating the placement of the vehicle into the recovery vessel. The apparatus includes a tubular member having a proximate end, a distal end with a first opening, and a first passageway formed therein. A handle is pivotally connected to near the proximate end of the tubular member. The handle has a second passageway formed therein. One end of the second passageway leads to the first passageway of tubular member. First and second claw members are connected at the distal end of the tubular member. The second claw member is hingedly connected to the first claw member. Each of the first and second claw members has an opening formed therein. The apparatus further includes a tension member connecting the first end of the handle to the second claw member such that movement of the handle causes movement of the second claw member.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
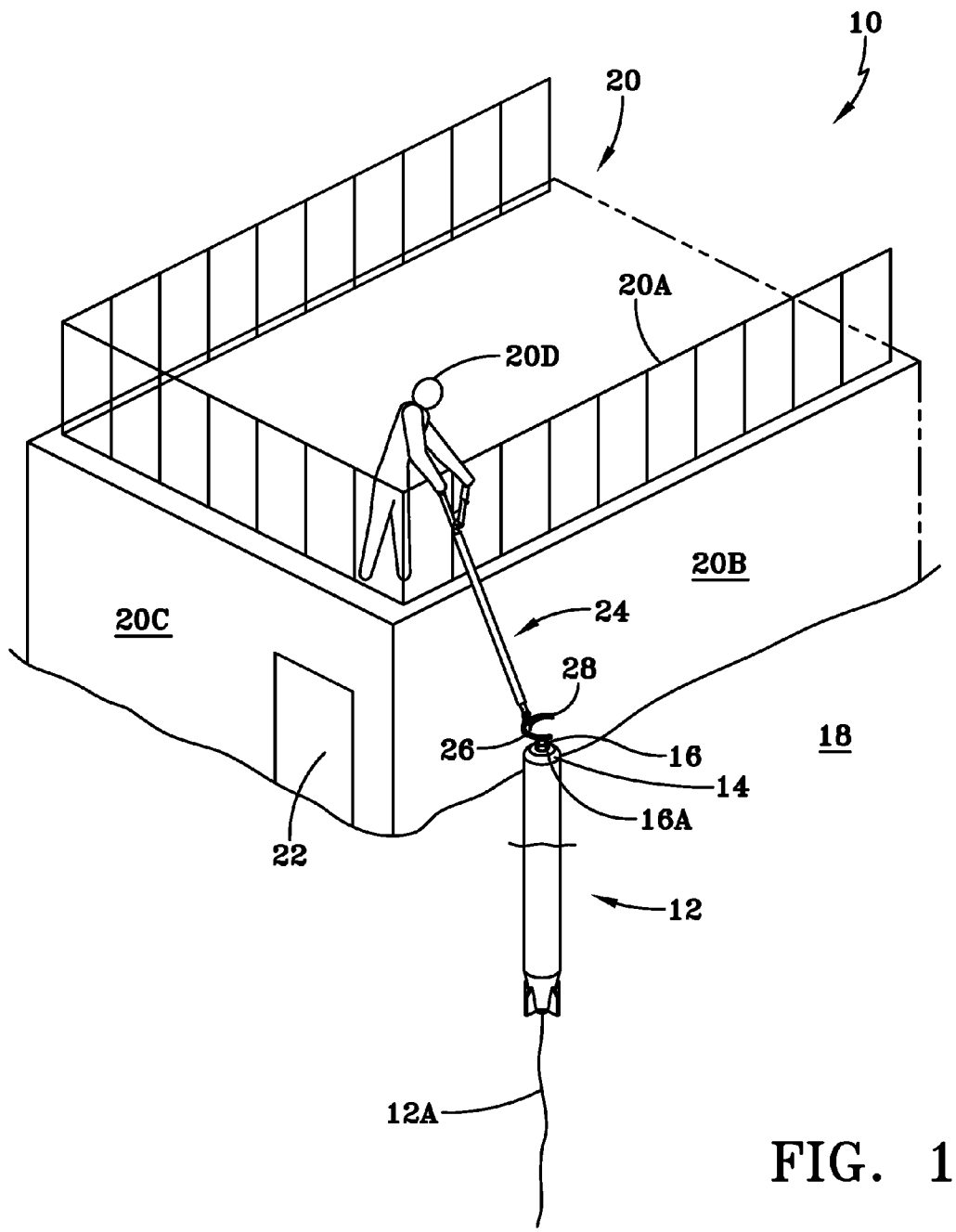
FIG. 1 generally illustrates the elements and operations involved in the retrieval of a vehicle in the water into a recovery vessel.

Referring now to the drawings, and more particularly to FIG. 1, there is illustrated some of the elements and operations, grouped by reference number 10, involved in the retrieval of a vehicle 12. The vehicle 12 has a streamer 12A, and a nose portion 14 which, in turn, has a collar 16 with a retrieval aperture 16A formed therein. Retrieval aperture 16A is provided in collar in order to allow for a snap-ring to be placed into the aperture 16A, while the vehicle 12 is in the water 18.

FIG. 1 partially illustrates a recovery vessel 20 as having a railing 20A, a side 20B, a front portion 20C, and provided with an operator 20D for the retrieval system 22, not fully shown, but known in the art. FIG. 1 further illustrates the operator 20D as holding the recovery stabilizing pole 24 of the present invention, which has a fixed claw member 26 and a hinged claw member 28. The recovery stabilizing pole 24 may be further described with reference to FIGS. 2A, 2B and 2C which are views of embodiments.

The recovery stabilizing pole 24 includes an extended tube 30 having an inner passageway 32 extending therethrough. Tube 30 is preferably made from a light weight metal and with a typical length in a range from about eight to nine feet. Tube 30 can be a solid member not having a passageway 32 but with external retaining members. Tube 30 has a proximate end 34, a distal end 36, and preferably a grip 38 positioned on proximate end 34.

The recovery stabilizing pole 24 further includes a handle 40. A grip 48 is positioned on a distal end of handle 40. A proximate end of handle 40 is joined to tube 30 by a pivot means 42. Pivot means 42 allows the handle 40 to pivot toward the tube 30 upon the application of pressure to the handle 40. Pivot means 42 can include a cam member 44 and pin 46, which cooperatively operate to apply tension to a flexible tension member 50 affixed to handle 40 at a mounting location 52. Pin 46 is optional and serves as a bearing to redirect flexible tension member 50 through passageway 32. A proximate aperture 54 is formed in tube 30 near the handle mounting means 52 and communicating with passageway 32. A distal aperture 56 communicating with passageway 32 is formed in distal end 36 of pole 30.

Flexible tension member 50 operatively connects the handle 40 to the hinged claw member 28. Flexible tension member or cable 50 can be any flexible member capable of supporting a tensile load. This can be an aramid fiber, metal cable or the like. Cable 50 should not stretch significantly when subjected to the planned tensile load and should be corrosion resistant in a marine environment. Preferably, flexible tension member or cable 50 is made from one quarter inch stainless steel wire rope. The cable 50 extends from mounting means 52, around cam 44, through the proximate aperture 54 into the passageway 32 and around pin 46. Cable 50 further extends down the passageway 32 and out of the distal aperture 56 at the distal end 36 of the tube 30. The cable 50 leaves aperture 56 and enters an opening 58 formed in fixed claw member 26. After passing through opening 58, cable 50 is affixed to a mounting location on hinged claw member 28. As described, a tensile force on cable 50 causes hinged claw member 28 to pivot inwardly.

A floatation member 60 can be affixed to tube 30. Floatation member 60 can be a cylindrical member that is dimensioned so as to correspond to the outer diameter of the tube 30. Floatation member 60 can be positioned to prevent pole 24 from sinking if it is inadvertently dropped, or it can be designed to support pole 24 during use. If floatation member 60 is designed to support pole during use, it can have an extended floatation structure near the anticipated waterline of recovery stabilizing pole 24.

Figure 2A:
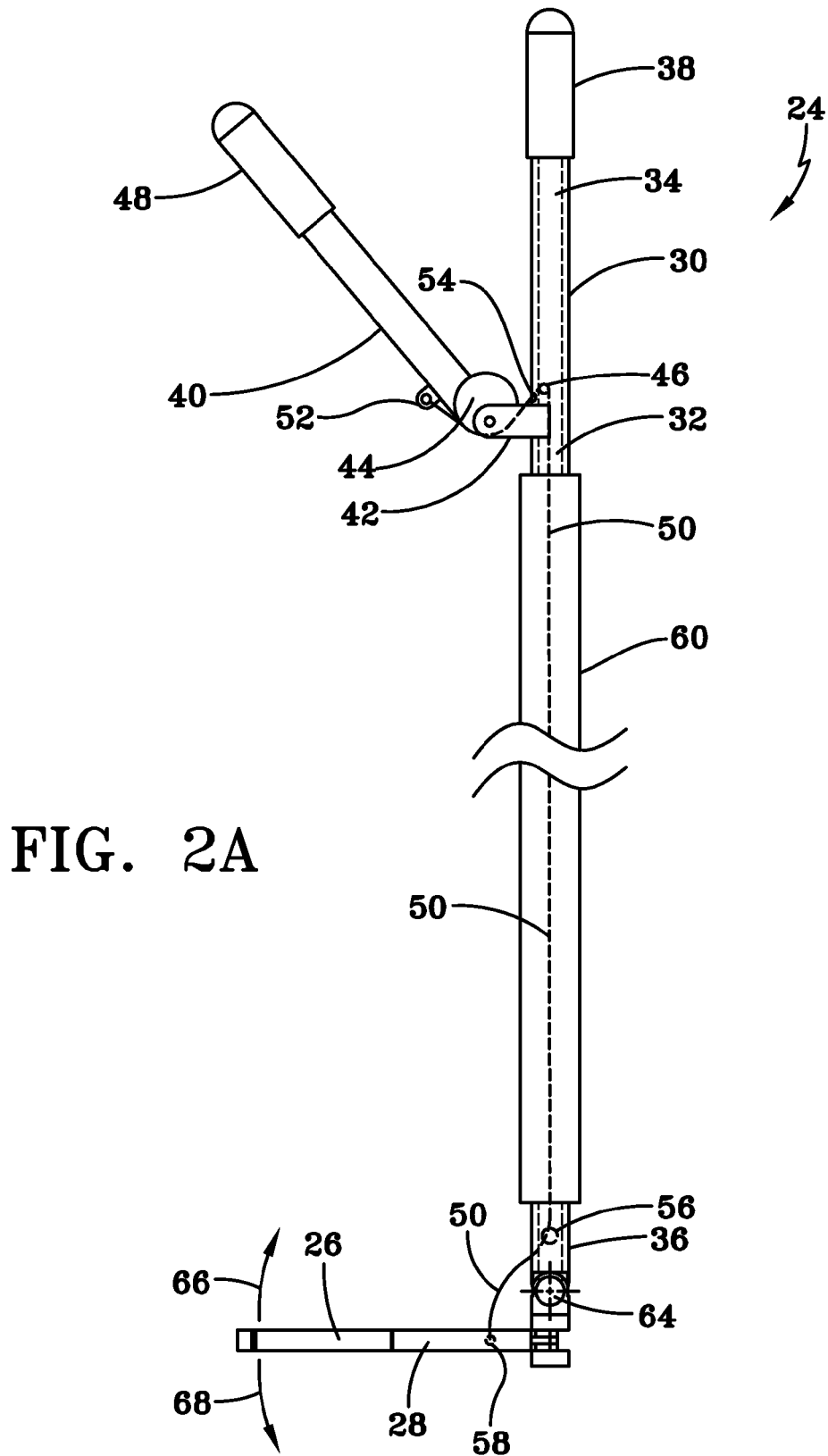
FIG. 2A is a view of the recovery stabilizing pole of the present invention.

The recovery stabilizing pole 24 can further include adjustment means 64, to be further described hereinafter with reference to FIG. 5. Adjustment means 64 provides for the movement of the claw members 26 and 28 in a direction reducing 66 or increasing 68 the angle between claw members 26 and 28 and tube 30, as shown in FIGS. 2A, 2B and 2C.

Figure 2B:
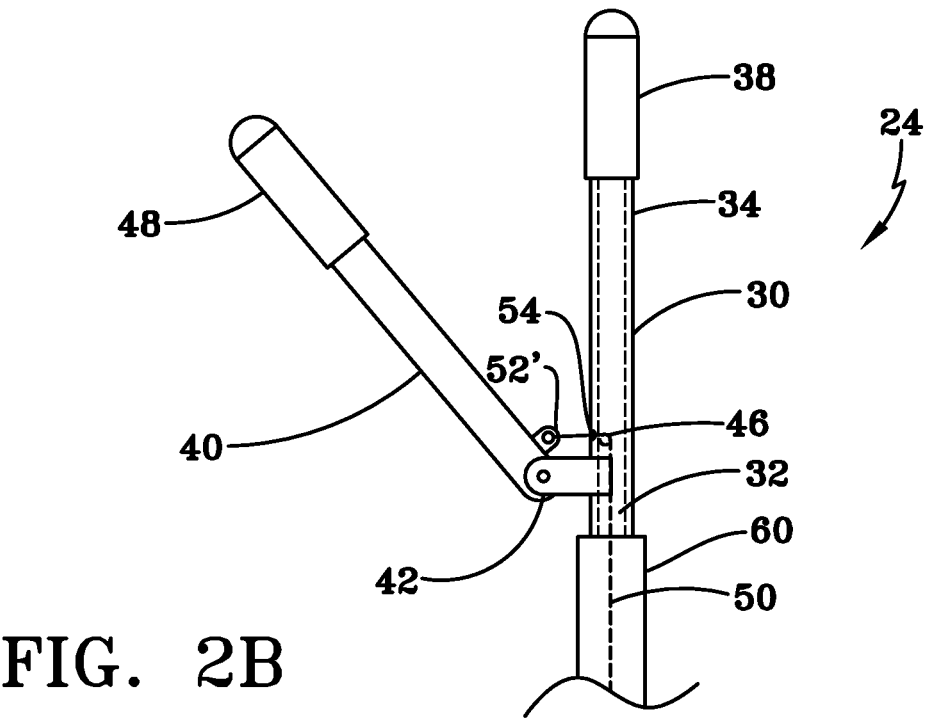
FIG. 2B is a view of a first alternative embodiment of the tension applying means shown in FIG. 2A.

FIG. 2B shows an alternative embodiment of pivot means 42 and handle 40 that allows tension to be applied to cable 50 when pivoting handle 40 away from tube 30. In this embodiment, handle 40 has a mounting location 52' formed on the surface of handle 40 near tube 30. Cable 50 is affixed to mounting location 52' such that pivoting handle 40 away from tube 30 increases the distance between mounting location 52' and pin 46, applying tension to cable 50.

Figure 2C:
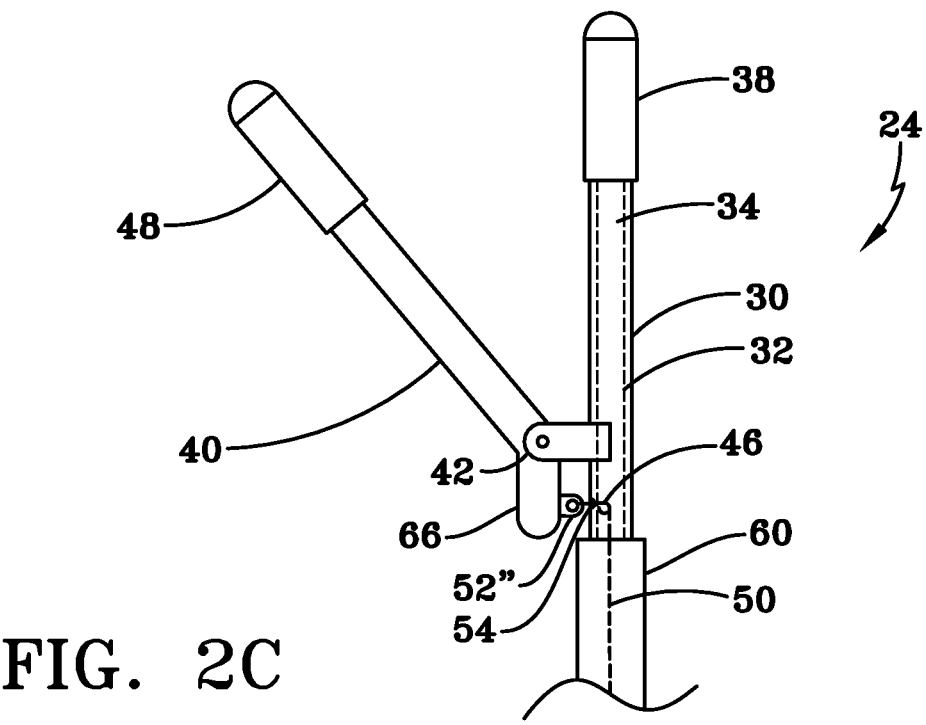
FIG. 2C is a view of a second alternative embodiment of the tension applying means shown in FIG. 2B.

FIG. 2C shows another alternative embodiment of pivot means 42 and handle 40. In this embodiment, handle 40 has a lever portion 66 in a portion of handle 40 extending past pivot means 42. A mounting location 52" is formed on the surface of lever portion 66 near tube 30. Cable 50 is affixed to mounting location 52" such that pivoting handle 40 toward tube 30 increases the distance between mounting location 52" and pin 46, applying tension to cable 50.

Figure 3:
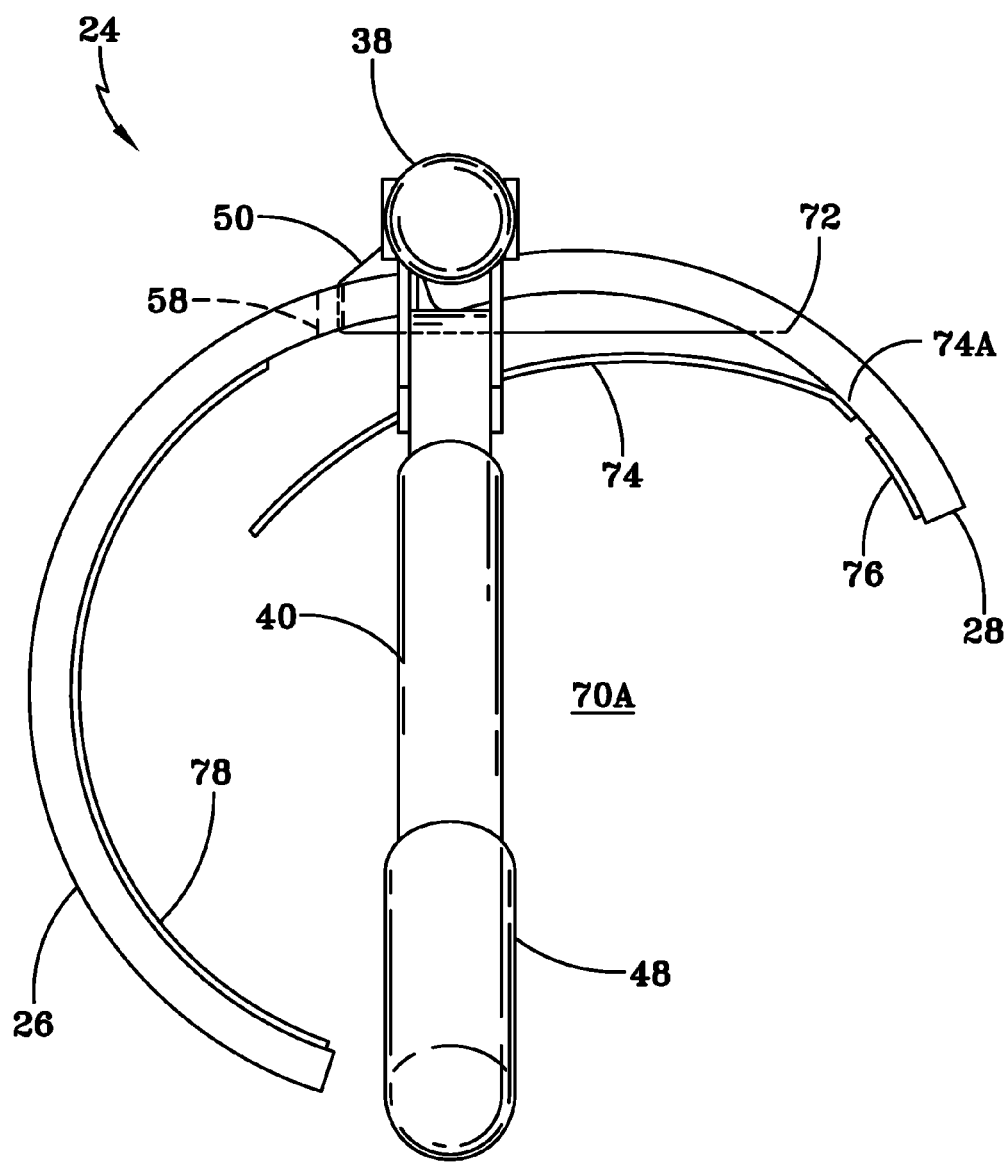
FIG. 3 is a top view of the recovery stabilizing pole of the present invention in the opened or non-engaged position.

The recovery stabilizing pole 24 may be further described with reference to FIG. 3 showing the claw members in an open or non-engaged position 70A. FIG. 3 illustrates the cable 50 as exiting opening 58 and extending to location 72 on the hinged claw member 28 where the cable 50 is affixed thereto by appropriate means, such as by knotting or welding. The recovery stabilizing pole 24 preferably further comprises an elastomeric strip 74 connected to the hinged claw member 28 by means such as screws, or adhesive means 74A. Elastomeric material for strip 74 is typically nylon or the like. The strip 74 operates to protect the vehicle being retrieved from any damage that may be caused by interaction thereof with cable 50. The hinged claw member 28 further preferably has a resilient coating 76, whereas the fixed claw member 26 has a resilient coating 78, both coatings 76 and 78 being provided, so as to prevent any sliding of the vehicle from the recovery stabilizing pole 24 in a manner to be further described with reference to FIGS. 7 and 8. Resilient coatings 76 and 78 are preferably natural or artificial rubber. The hinged claw member 28 is moveable, relative to fixed claw member 26, by means of a conventional hinge 80 to be further described hereinafter with reference to FIG. 5. The operation provided in part, by hinge 80 of the recovery stabilizing pole 24, may be further described with simultaneous reference to FIGS. 2A, 2B, 2C, 3, 4 and 5, and with FIG. 4 illustrating a closed or engaged position 70B.

Figure 4:
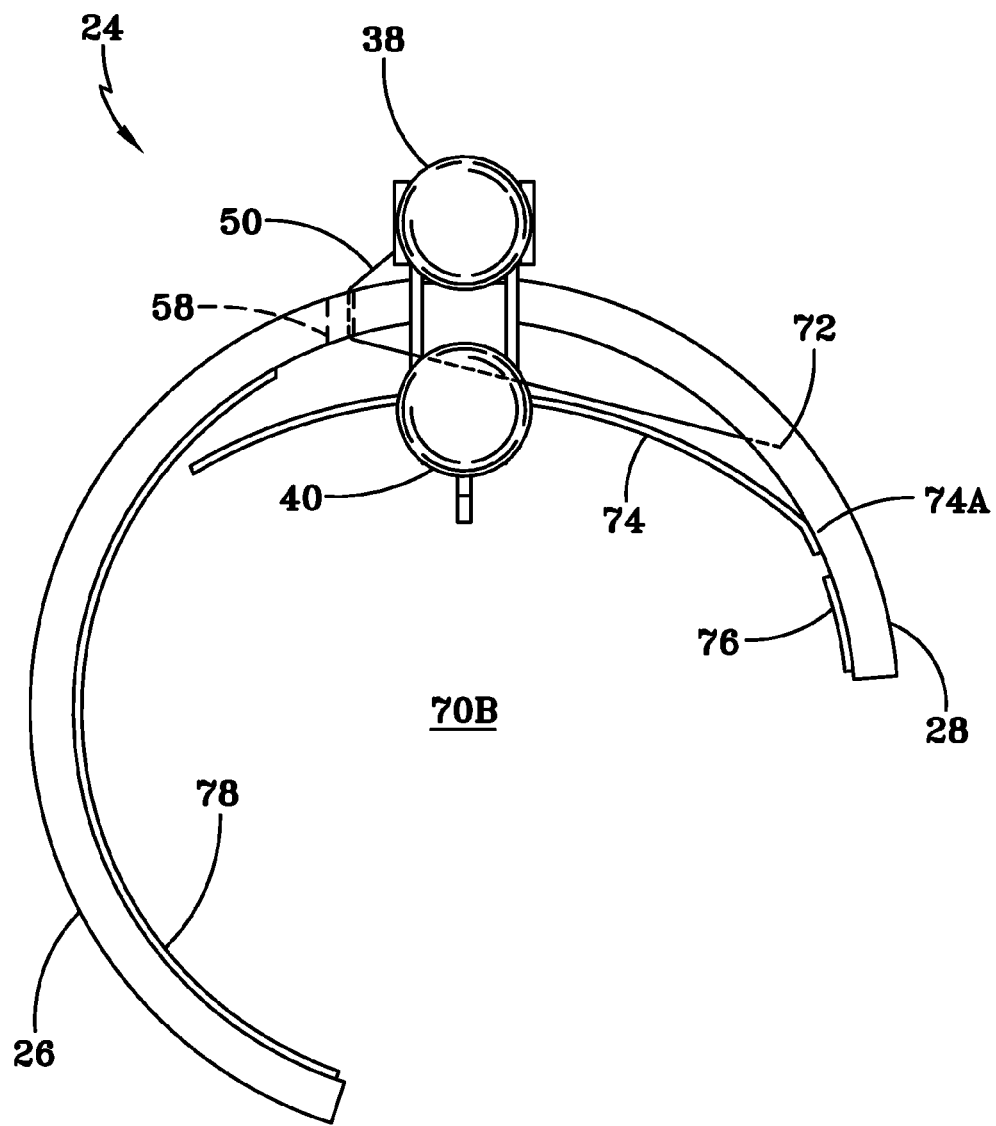
FIG. 4 is a top view of the recovery stabilizing pole of the present invention in the closed or engaged position.
Figure 5:
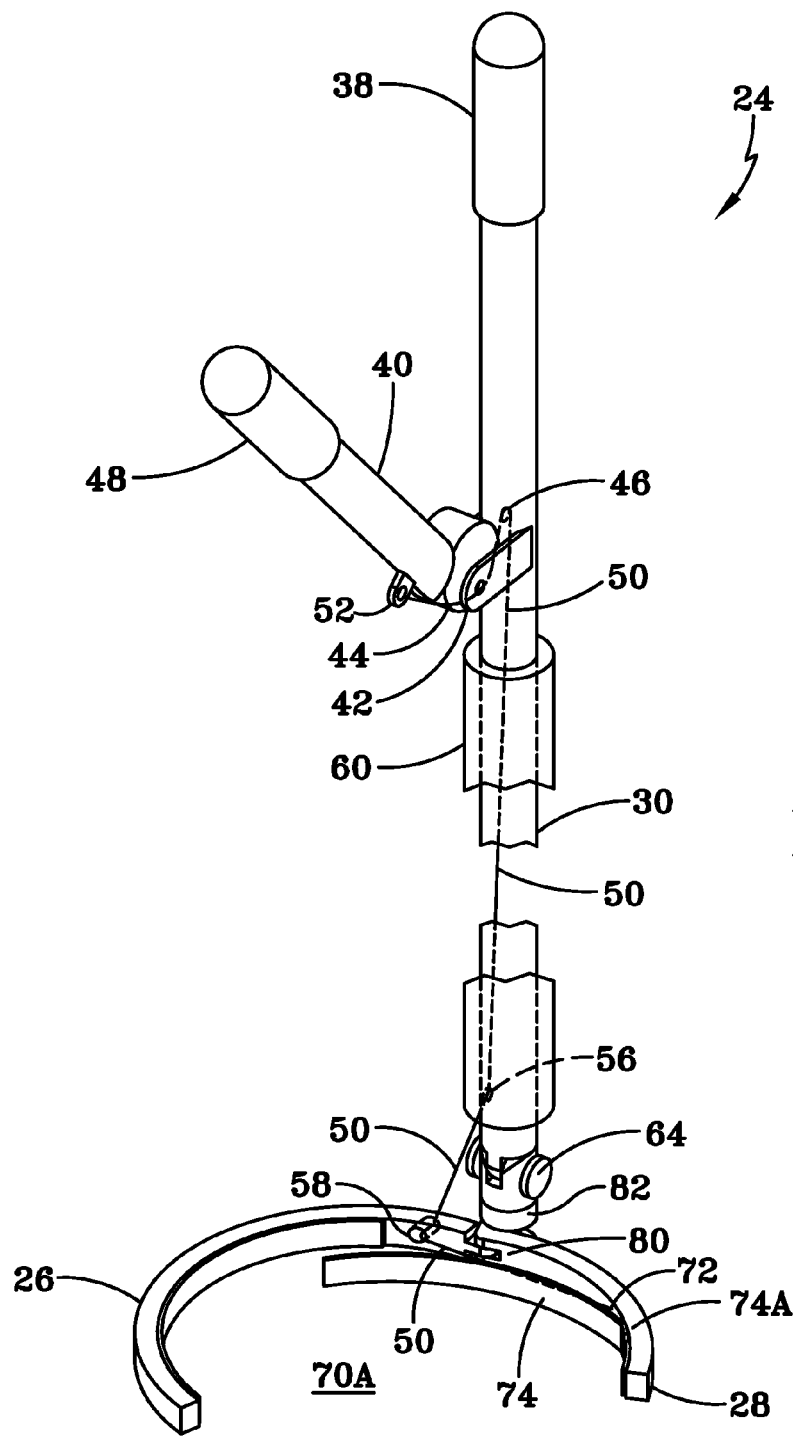
FIG. 5 is a side view of the recovery stabilizing pole of the present invention in the opened or non-engaged position.

With reference to FIG. 2A, it is apparent that as the handle 40 is pressed toward the tubular member 30, the cable 58, as most clearly seen in FIG. 4, pulls, by the operation of hinge 80 most clearly shown in FIG. 5, the hinged claw member 28 toward the fixed claw member 26, as most clearly seen in FIG. 4, thus providing a closed or engaged position 70B. The spacing between the hinged claw member 28 and fixed claw member 26 in the closed or engaged position 70B is selected or dimensioned, so as to correspond to the outer diameter of the nose 14 of the vehicle 12. The recovery stabilizing pole 24 may be further described with reference to FIG. 5, which is a side view thereof.

FIG. 5 shows all the elements previously described with reference to FIGS. 2A, 3 and 4, with the exception of connector 82. Connector 82 allows for the interconnection thereto of both the fixed claw member 26 and the hinged claw member 28. Connector 82 is rigidly attached to the fixed claw member 26, and the hinged claw member 28, and operatively connected to adjustment means 64. The adjustment means 64 is operated so as to move the claw members 26 and 28 in upward 66 and downward 68 directions, with both directions 66 and 68 having been previously described with reference to FIG. 2A. The operation of recovery stabilizing pole 24 may be further described with reference back to FIG. 5.

FIG. 5 shows the handle 40 in the open position (handle 40 separated from member 30) thereby allowing the fixed and hinged members 26 and 28, respectively, to be in their non-engaged or open position 70A. The operation of the recovery stabilizing pole 24 may be further described with simultaneous reference to FIGS. 5 and 6.

Figure 6:
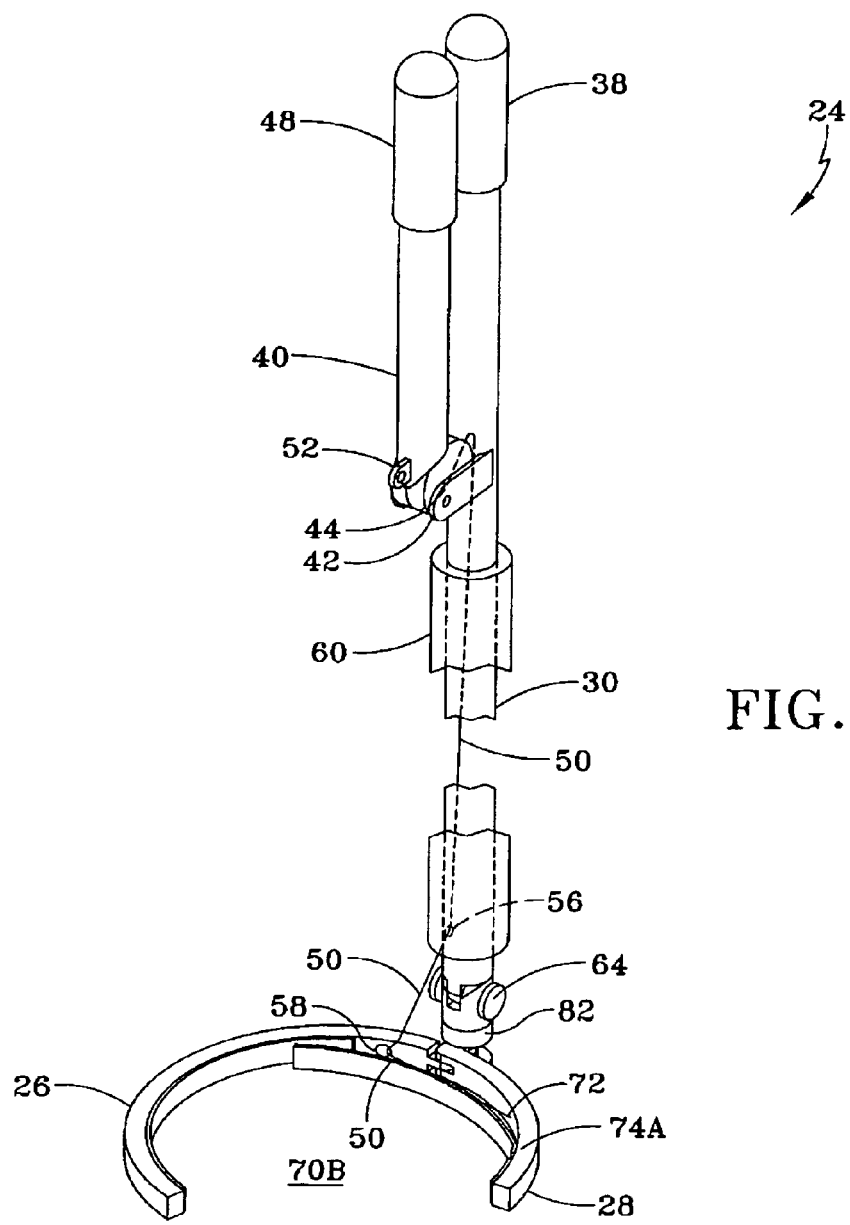
FIG. 6 is a side view of the recovery stabilizing pole of the present invention in the closed or engaged position.

As seen in FIG. 6, unlike FIG. 5, the handle 40 has been moved, so as to apply pressure to pivotally move the handle 40 toward the tubular member 30, thereby causing cable 50 to pull the moveable hinged claw member 28 toward the fixed claw member 26, so as to establish the closed or engaged position 70B, previously described with reference to FIG. 4. The operation of the recovery stabilizing pole may be further described with reference to FIG. 7.

Figure 7:
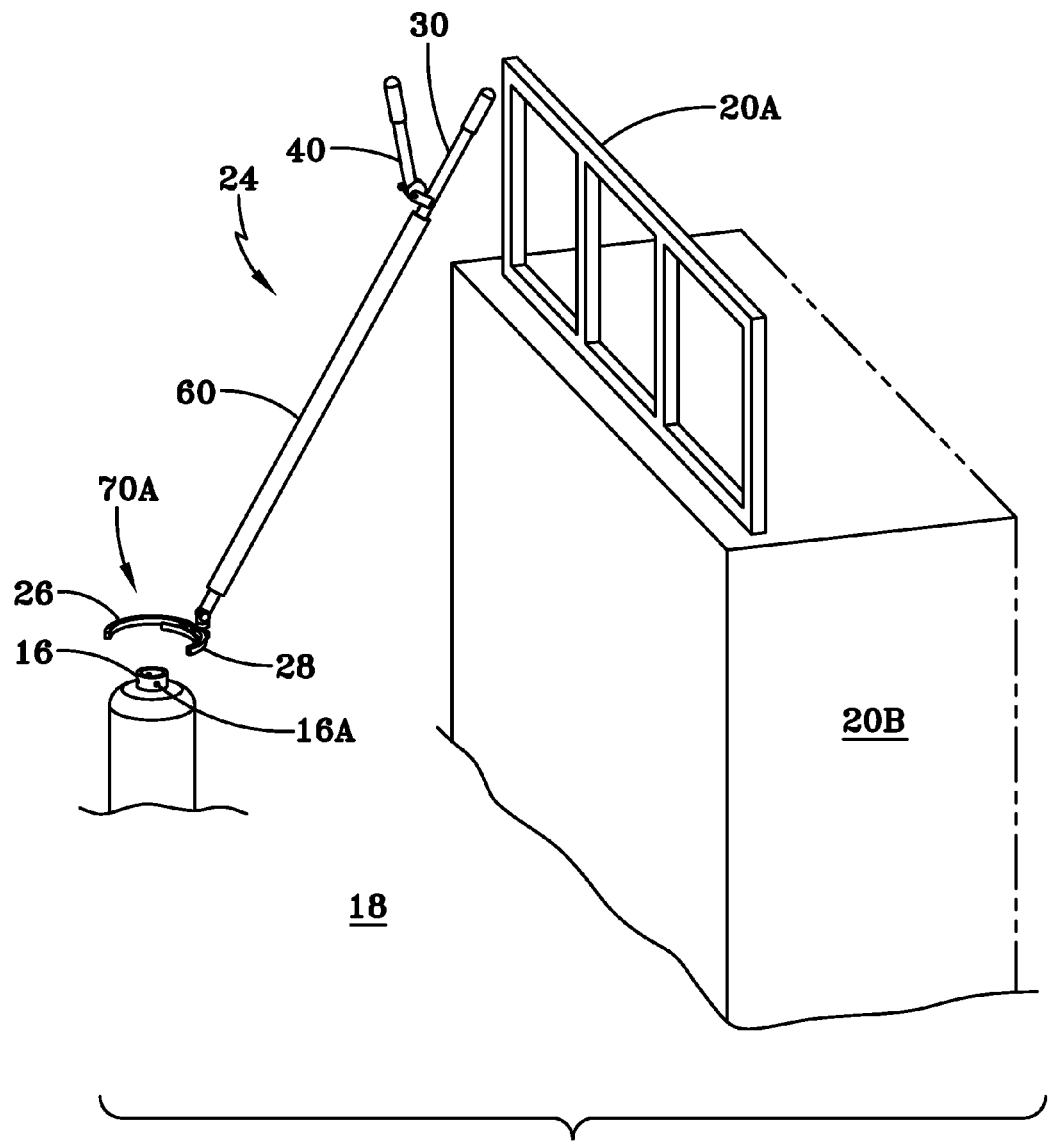
FIG. 7 generally illustrates the position of the recovery stabilizing pole prior to its engagement with a vehicle.

FIG. 7 shows the recovery stabilizing pole 24 in its open or non-engaged position 70A and with the handle 40 in its non-operative position thereby being separated from the member 30. More particularly, the recovery stabilizing pole 24 is positioned above the bobbing vehicle 12. The engagement of the recovery pole 24 with the vehicle 12 can be further described with reference to FIG. 8.

Figure 8:
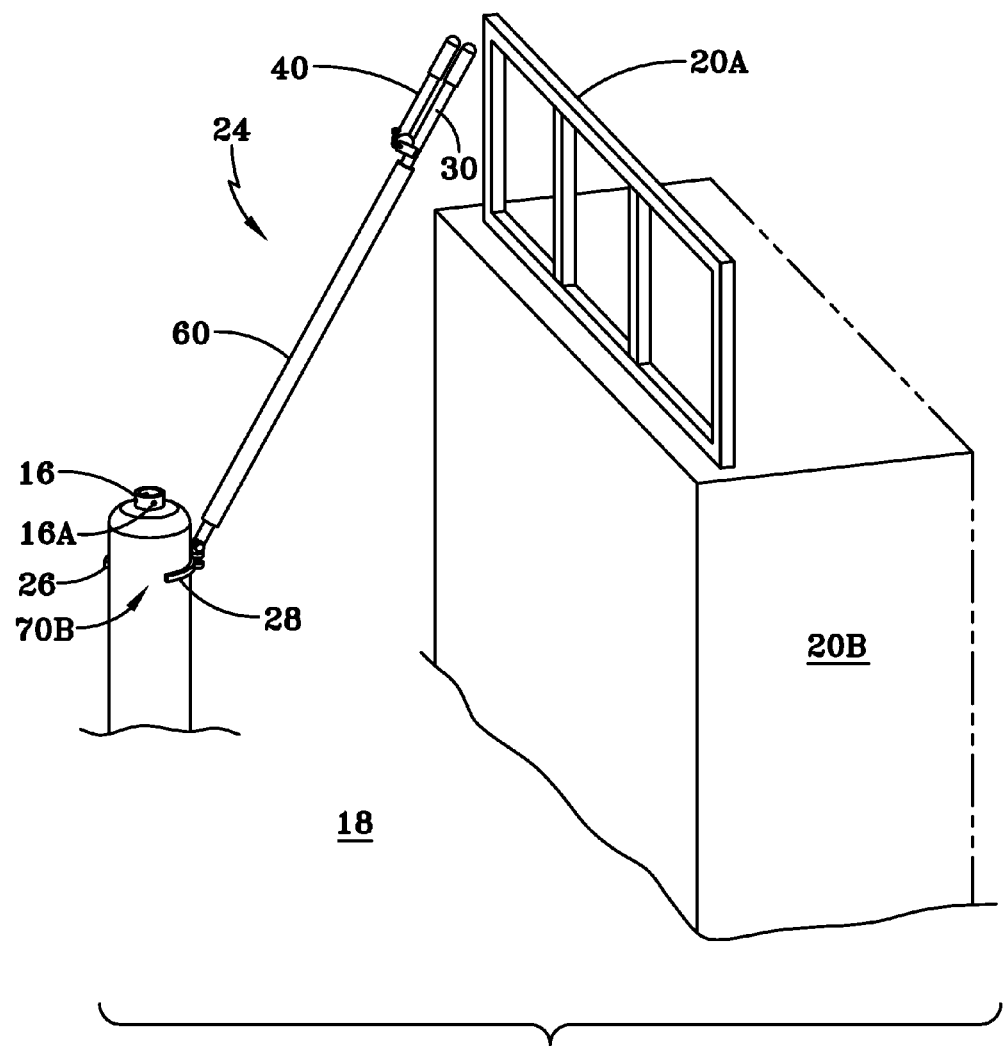
FIG. 8 generally illustrates the position of the recovery stabilizing pole of the present invention engaged with and stabilizing the vehicle.

FIG. 8 shows the recovery stabilizing pole 24 as having its handle 40 pressed against the member 30 thereby causing the hinged member 26 (not shown) to engage the vehicle 12. In this engaged position, the vehicle 12 and, as shown in FIG. 1, can be stabilized and can be moved to the front 20C of recovery vessel 20, allowing it to be manipulated and placed onto the vehicle recovery system 22 after the attachment of a slip-ring to aperture 16A, so as to be more easily placed on board the recovery vessel 20.

Figure 9:
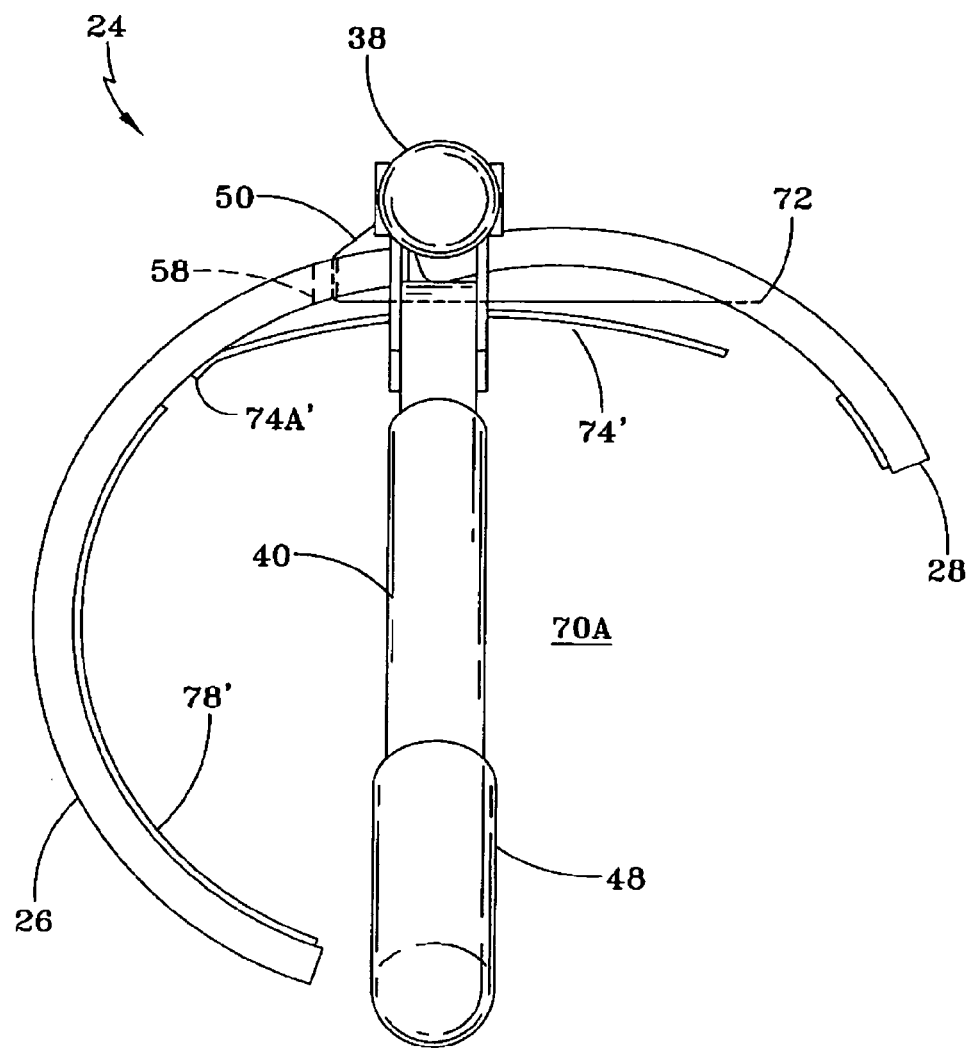
FIG. 9 is a top view of an alternate embodiment of the recovery stabilizing pole of the present invention in the opened or non-engaged position.

In FIG. 9, there is shown an alternate embodiment having an alternate version of elastomeric strip shown as 74' and resilient coating 78'. Elastomeric strip 74' is fixed to fixed claw member 26 at 74a'. Elastomeric strip 74' extends toward hinged claw member 28 to protect cable 50 from interference with a vehicle being recovered. Resilient coating 78' covers less of member 26 to allow mounting of strip 74'.

As a variation either or both handle 40 and tubular member 30 could be made from a solid material without having a passageway formed therein. In this variation, tabs having eyes therethrough could be attached at periodic places along tubular member 20 and handle 40 to serve as guides for cable 50.

It should now be appreciated that the practice of the present invention provides a recovery stabilizing pole which stabilizes a floating and bobbing vehicle 12, so as to allow the slip ring (not shown) of the recovery system 22 to be more easily attached to the nose 14, in particular aperture 16A of the vehicle 12. The present invention reduces the time consumed in the retrieval process of the vehicle 12 in the water, while at the same time preventing the recovery vessel 20 from being damaged by the vehicle 12, especially during high sea state conditions with the vehicle 12 rapidly bobbing up and down.

It will be understood that many additional changes in details, materials, steps and arrangement of parts, which have been herein described and illustrated in order to explain the nature of the invention, may be made by those skilled in the art within the principle and scope of the expressed in the appended claims.

What is claimed is:

1. An apparatus for steadying floating objects:
a tubular member having a proximate end, a distal end and a passageway formed therein, a first opening being formed in said tubular member in communication with said passageway at the distal end, a second opening formed in communication with said passageway;
a handle having a first end and a second end, said handle second end being pivotally mounted to said tubular member at a pivotal mounting location toward said proximate end of said tubular member, said tubular member second opening being formed near said handle;
a fixed claw member positioned at the distal end of said tubular member, said fixed claw member having an opening therein;
a pivotal claw member positioned at the distal end of said tubular member proximate said fixed claw member and being capable of pivoting with respect to said fixed claw member, said pivotal claw member having a mounting location formed thereon; and
a cable having a proximate end joined to said handle and extending into said tubular member second aperture, through said tubular member passageway, out from said tubular member first opening, into said fixed claw member opening and a distal end joined to said pivotal claw mounting location, whereby movement of said handle applies tension to said cable causing said pivotal claw member to pivot with respect to said fixed claw member wherein said cable is mounted to said handle between said first end of said handle end said pivotal mounting location such that movement of said handle away from said tubular member causes tension in said cable.

2. The apparatus according to claim 1, further comprising an adjustment means joined between said tubular member distal end and said fixed claw member and said pivotal claw member, said adjustment means being capable of adjusting the angle of said fixed claw member and said pivotal claw member with respect to said tubular member.

3. The apparatus according to claim 1, further comprising a buoyant member joined to said tubular member.

4. The apparatus according to claim 1, wherein said tubular member has a length from about eight to about nine feet.

5. The apparatus according to claim 1, wherein:
said fixed claw member has a surface for engaging with an object, said fixed claw member surface being coated with a resilient material; and
said pivotal claw member has a surface for engaging with an object, said pivotal claw member surface being coated with a resilient material.

6. The apparatus according to claim 1, further comprising a cam positioned on said handle at said pivotal mounting location, said cable being retained on said cam such that movement of said handle rotates said cam changes a distance between said cable and the pivotal mounting location and thereby changes tension in said cable.

7. The apparatus according to claim 6, further comprising a pin positioned in said tubular member proximate said second opening for redirecting said cable.

8. The apparatus according to claim 1, further comprising a pin positioned in said tubular member proximate said second opening for redirecting said cable.

9. An apparatus for steadying floating objects:
a tubular member having a proximate end, a distal end and passageway formed therein, a first opening being formed in said tubular member in communication with said passageway at the distal end, a second opening formed in communication with said passageway;
a handle having a first end and a second end, said handle second end being pivotally mounted to said tubular member at a pivotal mounting location toward said proximate end of said tubular member, said tubular member second opening being formed near said handle;
a fixed claw member positioned at the distal end of said tubular member, said fixed claw member having an opening therein;
a pivotal claw member positioned at the distal end of said tubular member proximate said fixed claw member and being capable of pivoting with respect to said fixed claw member, said pivotal claw member having a mounting location formed thereon;
a cable having a proximate end joined to said handle and extending into said tubular member second aperture, through said tubular member passageway, out from said tubular member first opening, into said fixed claw member opening and a distal end joined to said pivotal claw mounting location, whereby movement of said handle applies tension to said cable causing said pivotal claw member to pivot with respect to said fixed claw member; and
an elastomeric strip joined only to said pivotal claw member and positionable between the object and said cable.

10. An apparatus for steadying floating objects:
a tubular member having a proximate end, a distal end and a passageway formed therein, a first opening being formed in said tubular member in communication with said passageway at the distal end, a second opening formed in communication with said passageway;

a handle having a first end and a second end, said handle second end being pivotally mounted to said tubular member at a pivotal mounting location toward said proximate end of said tubular member, said tubular member second opening being formed near said handle;

a fixed claw member positioned at the distal end of said tubular member, said fixed claw member having an opening therein;

a pivotal claw member positioned at the distal end of said tubular member proximate said fixed claw member and being capable of pivoting with respect to said fixed claw member, said pivotal claw member having a mounting location formed thereon;

a cable having a proximate end joined to said handle and extending into said tubular member second aperture, through said tubular member passageway, out from said tubular member first opening, into said fixed claw member opening and a distal end joined to said pivotal claw mounting location, whereby movement of said handle applies tension to said cable causing said pivotal claw member to pivot with respect to said fixed claw member; and an elastomeric strip joined only to said fixed claw member and positionable between the object and said cable.

\* \* \* \* \*